United States Patent
Dziuk et al.

(10) Patent No.: US 12,348,824 B2
(45) Date of Patent: Jul. 1, 2025

(54) SYSTEMS AND METHODS FOR PROVIDING USER INTERFACES FOR MIXED MEDIA CONTENT TYPES

(71) Applicant: Spotify AB, Stockholm (SE)

(72) Inventors: Dariusz Dziuk, Brooklyn, NY (US); Romuald Georges Cari, Brooklyn, NY (US); Zhenyuan Shi, Jersey City, NJ (US); Anton Scheutz Godin, Stockholm (SE); Joanna Mitchell, Leamington Spa (GB)

(73) Assignee: Spotify AB, Stockholm (SE)

( * ) Notice: Subject to any disclaimer, the term of this patent is extended or adjusted under 35 U.S.C. 154(b) by 65 days.

(21) Appl. No.: 18/330,261

(22) Filed: Jun. 6, 2023

(65) Prior Publication Data

US 2024/0414406 A1 Dec. 12, 2024

(51) Int. Cl.
*H04N 21/482* (2011.01)
(52) U.S. Cl.
CPC ................ *H04N 21/482* (2013.01)
(58) Field of Classification Search
CPC .................................................. H04N 21/482
See application file for complete search history.

(56) References Cited

U.S. PATENT DOCUMENTS

| | | | | |
|---|---|---|---|---|
| 5,616,876 A | * | 4/1997 | Cluts | G06F 16/634 348/E7.071 |
| 9,648,389 B1 | * | 5/2017 | Pike | H04N 21/4312 |
| 9,733,809 B1 | * | 8/2017 | Greene | G06F 3/0486 |
| 9,940,632 B2 | * | 4/2018 | Harb | G06Q 30/02 |
| 10,083,232 B1 | * | 9/2018 | Durham | H04N 21/4826 |
| 10,115,435 B2 | * | 10/2018 | Lee | H04N 21/4825 |
| 10,219,027 B1 | * | 2/2019 | O'Neill | H04N 21/4312 |
| 10,223,447 B2 | | 3/2019 | Jehan | |
| 11,435,876 B1 | * | 9/2022 | Kakati | G06F 9/451 |
| 2003/0046399 A1 | * | 3/2003 | Boulter | G06F 16/435 709/228 |
| 2006/0173825 A1 | * | 8/2006 | Hess | G06F 16/953 |
| 2006/0174316 A1 | * | 8/2006 | Gregorian | H04N 21/854 725/38 |
| 2007/0219937 A1 | * | 9/2007 | Lee | H04N 21/4325 |

(Continued)

FOREIGN PATENT DOCUMENTS

| | | |
|---|---|---|
| CN | 111818367 A | 10/2020 |
| CN | 112738633 A | 4/2021 |
| CN | 107172454 B | 7/2021 |

*Primary Examiner* — James R Sheleheda
(74) *Attorney, Agent, or Firm* — Morgan, Lewis & Bockius LLP

(57) ABSTRACT

A computer system provides, from a playback queue of a plurality of audio items, a played audio item of the plurality of audio items for playback and displays representation of a video content item associated with a first audio item. In response to the first user input selecting the representation of the video content item, the computer system displays or otherwise provides a user interface for browsing a plurality of video content items. The computer system detects a second user input selecting a representation of a second audio item that is associated with a second video content item displayed in the user interface and in response to the second user input, displays or otherwise provides, a user interface for the second audio item and ceasing display of the second video content item.

20 Claims, 10 Drawing Sheets

(56) References Cited

U.S. PATENT DOCUMENTS

| | | | |
|---|---|---|---|
| 2008/0065720 A1* | 3/2008 | Brodersen | G06F 16/4393 709/204 |
| 2010/0153885 A1* | 6/2010 | Yates | G06F 16/7867 707/723 |
| 2010/0153999 A1* | 6/2010 | Yates | H04N 21/472 725/39 |
| 2011/0022620 A1* | 1/2011 | Woods | H04N 21/84 707/769 |
| 2011/0071977 A1* | 3/2011 | Nakajima | G06F 16/433 715/810 |
| 2012/0159327 A1* | 6/2012 | Law | H04N 21/47217 715/716 |
| 2013/0031216 A1* | 1/2013 | Willis | H04L 65/1069 709/219 |
| 2014/0040715 A1* | 2/2014 | Younge | G06F 40/166 715/203 |
| 2014/0172961 A1* | 6/2014 | Clemmer | H04L 65/611 709/203 |
| 2014/0324885 A1* | 10/2014 | McKenzie | G06F 16/9038 707/748 |
| 2015/0220525 A1* | 8/2015 | Ross | G06F 16/435 707/737 |
| 2016/0300280 A1* | 10/2016 | Alsina | H04N 21/2743 |
| 2018/0095656 A1* | 4/2018 | Ingah | H04N 21/42208 |
| 2018/0129370 A1* | 5/2018 | Sessak | G06F 3/0482 |
| 2021/0004128 A1 | 1/2021 | Carrigan et al. | |

\* cited by examiner

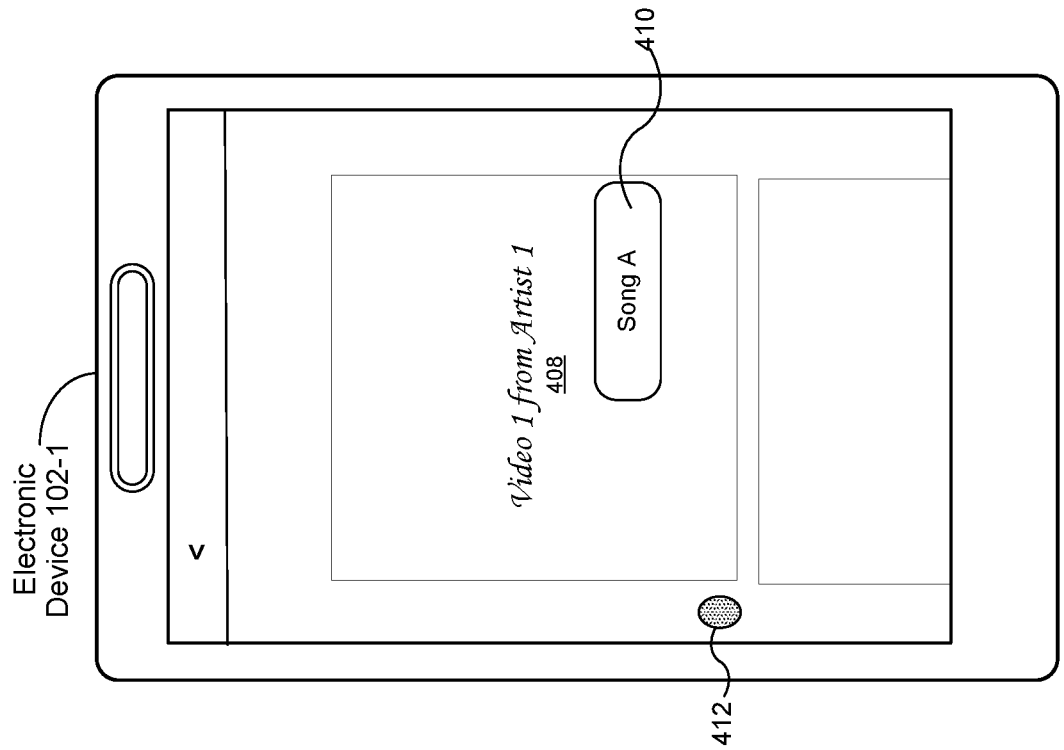
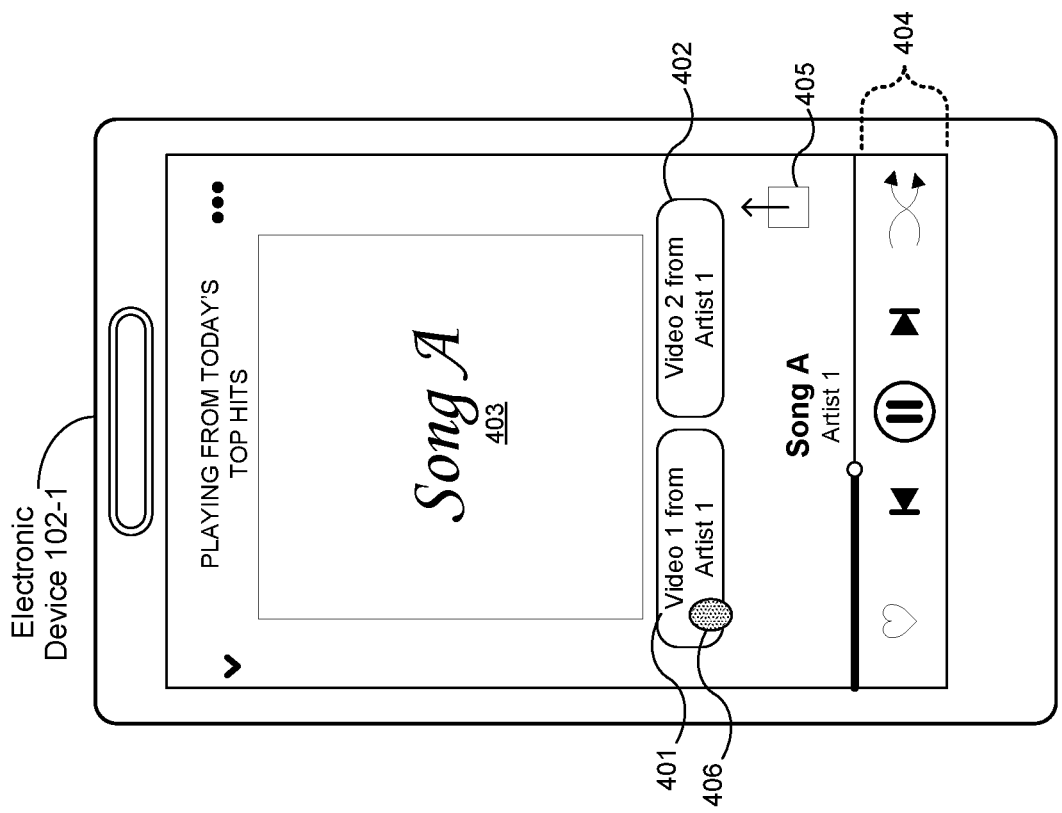
FIG. 4B
FIG. 4A

500

502 Provide, from a playback queue of a plurality of audio items, a played audio item of the plurality of audio items for playback.

> 504 The playback queue is a curated list of audio items.

> 506 The playback queue is an ordered list of audio items that is stored.

508 While providing the played audio item for playback, provide a representation of a video content item associated with a first audio item, wherein the video content item includes audio content that is distinct from audio content from the first audio item.

510 Receive a first user input selecting the representation of the video content item.

512 In response to the first user input:
  provide a user interface for browsing a plurality of video content items, including (i) the video content item associated with the first audio item and (ii) one or more other video content items respectively associated with one or more other audio items distinct from the first audio item.

> 511 In response to the first user input, (i) cease playback of the played audio item and (ii) provide the user interface for browsing the plurality of video content items, including providing an unmuted version of audio content of the plurality of video content items.

> 513 In response to the first user input, (i) continue playback of the played audio item and (ii) provide the user interface for browsing the plurality of video content items, including providing a muted version of audio content of the plurality of video content items.

514 Detect a second user input selecting a representation of a second audio item that is associated with a second video content item of the one or more other video content items provided in the user interface.

516 In response to the second user input selecting the second audio item, provide, a user interface for the second audio item and ceasing to provide the second video content item.

> 518 While providing the user interface for the second audio item, reinitiating playback of the played audio item in the playback queue.

> 520 Each respective video content item of the one or more other video content items in the user interface for browsing the plurality of video content items is provided with a representation of the respective audio item that is associated with the respective video content item.

> 522 While providing the user interface for browsing the plurality of video content items, automatically initiate playback of a video content item of the plurality of video content items in the provided user interface, wherein the video content item is associated with the first audio item.

> 524 While providing the user interface for browsing the plurality of video content items, receive a user input to navigate back to the playback queue.

> 526 The one or more other video content items provided in the user interface include respective video content items uploaded by different respective users.

528 In response to the second user input selecting the second audio item, provide, for playback, the second audio item.

530 The video content item that is associated with the first audio item is associated with a first user; and
    the one or more other video content items respectively associated with one or more other audio items distinct from the first audio item provided in the user interface are respectively associated with a plurality of distinct users other than the first user.

532 The one or more other video content items provided in the user interface for browsing a plurality of video content items are selected using a recommender engine; and
    in response to detecting the second user input selecting the representation of the second audio item that is associated with the second video content item of the one or more other video content items provided in the user interface, update the recommender engine based on the second user input.

534 While providing the user interface for browsing a plurality of video content items, detect a user input to scroll the user interface; and
    provide a representation of the second video content item and the representation of the second audio item that is associated with the second video content item in the user interface.

536 After detecting the user input to scroll the user interface, automatically play back the second video content item.

538 In response to the user input to scroll the user interface, cease to provide the video content item associated with the first audio item in the user interface.

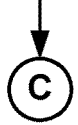

FIG. 5C

540 Receive a fourth user input corresponding to a request to associate the first audio item with the video content item; and
in response to receiving the fourth user input, associate the first audio item with the video content item.

542 The first user input selecting the representation of the video content item is received from a first user; and
the fourth user input is received from a second user, distinct from the first user.

544 For each respective video content item in the one or more other video content items provided in the user interface, determine a respective score based on stored data for the respective video content item, the stored data indicating an affinity (i) between the first user and the second user that uploaded the respective video content item and/or (ii) between the first user and a music entity linked to the respective video content item.

546 Determine an order to provide the one or more other video content items based on respective affinity scores for the respective video content items in the one or more other video content items.

SYSTEMS AND METHODS FOR PROVIDING USER INTERFACES FOR MIXED MEDIA CONTENT TYPES

TECHNICAL FIELD

The disclosed embodiments relate generally to media provider systems, and, in particular, to navigating between user interfaces for displaying audio items and for displaying video items in a video feed.

BACKGROUND

Recent years have shown a remarkable growth in consumption of digital goods such as digital music, movies, books, and podcasts, among many others. The overwhelmingly large number of these goods often makes navigation and discovery of new digital goods an extremely difficult task. To cope with the constantly growing complexity of navigating the large number of goods, users create and select playlists to easily organize and access media items, including playlists curated by the users themselves and playlists curated by other parties, such as content providers.

Organizing digital goods by associating content with related goods provides the user with an improved way of discovering and navigating content that may be of interest to the user. Although the ability to organize digital goods is helpful, it is typically still difficult for a user to, e.g., locate and/or discover new digital goods that are of interest to the user.

SUMMARY

Providing the user with an easy way to discover and access content, e.g., through video content that is linked to audio content, improves the user experience and provides more efficient user interfaces for navigating digital goods.

To that end, a media content provider may allow a subset of users (e.g., artists, producers, or other users) to upload content with the option to associate the uploaded content with one or more existing content items provided by the media content provider. In some embodiments, the media content provider displays the uploaded content concurrently (or a representation of the uploaded content) with the existing content items associated with the uploaded content while the user consumes one of the existing content items. As such, the media content provider allows the user to view and browse different content items (e.g., including different types of content items, such as tracks, albums, and/or video) that are associated with other content items provided by the media content provider.

Disclosed is an approach to enable discovery of catalog audio items (e.g., tracks, albums, etc.) of a music streaming service via a video feed (e.g., an "artist expression" video feed) displayed in an application of the streaming service, the video feed including videos uploaded and respectively linked to catalog audio items by, for example, artists or other users.

In particular, while playing a track from a playback queue, such as a playlist, album, or other ordered set of tracks, a device may display a "user-side" user interface associated with a catalog audio item which can be (but is not necessarily) the playing track (e.g., the user interface may display an album page of an album that includes the playing track or an album page of an album that includes tracks other than the playing track). This user interface may provide an affordance (e.g., display a thumbnail, a link or other indication via the user interface) of a video content item that has been associated with the catalog audio item. For example, the video content item is uploaded by the artist of a track and provides context or more information about the track (e.g., the artist may upload the video content item and "link" it (via an "artist-side" user interface) to the track that is found in the catalog of the music streaming service, so that a corresponding affordance is then shown in the "user-side" user interface associated with the track (e.g., a video thumbnail shown next to the track's name in an album page)).

In response to a user (e.g., consumer, listener, and/or fan) selecting the affordance, the device (i) optionally ceases playback of the listening session (e.g., the currently playing track) and (ii) displays a video feed that includes the video content item related (linked) to the catalog audio item, as well as other video content items (e.g., other video clips from the same artist and/or from other artists that have each been respectively linked to other catalog audio items) in a video feed user interface. As such, the user can navigate from a listening session to viewing a video feed, doing so via a user interface representation of a catalog item including the affordance (e.g., via the video thumbnail shown next to the track's name in the album page, where the video corresponding to the video thumbnail has been linked to the track, e.g., by an artist).

Furthermore, each video clip in the video feed is respectively attached to a different catalog audio item such that, when a given one of the video clips is played in the feed, a representation of its 'linked' catalog audio item is also simultaneously displayed. In this way, the user can browse and/or scroll through the video feed to a next video clip and then select a representation of a catalog audio item (e.g., a different track) 'linked' to that next video clip in the feed. Upon such selection, the device may responsively (i) cease playback of the video feed, (ii) display a user interface representing the selected catalog audio item, and (iii) either automatically initiate playback of the selected catalog audio item or re-initiate playback of the listening session (e.g., continue playing the track that was played before the listening session was ceased, which may be different from the catalog audio item that was selected via the video feed and is now being viewed via the user interface).

To that end, in accordance with some embodiments, a method is provided. The method includes providing, from a playback queue of a plurality of audio items, a played audio item of the plurality of audio items for playback. The method further includes, while providing the played audio item for playback, displaying (or otherwise providing) a representation of a video content item associated with a first audio item, wherein the video content item includes audio content that is distinct from audio content from the first audio item. The method includes receiving a first user input selecting the representation of the video content item and, in response to the first user input, displaying a user interface for browsing a plurality of video content items, including (i) the video content item associated with the first audio item and (ii) one or more other video content items respectively associated with one or more other audio items distinct from the first audio item; detecting a second user input selecting a representation of a second audio item that is associated with a second video content item of the one or more other video content items displayed in the user interface. The method further includes, in response to the second user input selecting the second audio item, displaying, a user interface for the second audio item and ceasing display of the second video content item.

In accordance with some embodiments, an electronic device is provided. The electronic device includes one or more processors and memory storing one or more programs. The one or more programs include instructions for performing any of the methods described herein.

In accordance with some embodiments, a non-transitory computer-readable storage medium is provided. The non-transitory computer-readable storage medium stores one or more programs for execution by an electronic device with one or more processors. The one or more programs comprising instructions for performing any of the methods described herein.

Thus, systems are provided with improved methods for providing a playback queue and displaying a video feed with a video that is linked to an audio item in the playback queue.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 4A-4F are block diagrams illustrating user interfaces for navigating between different types of media items, in accordance with some embodiments.

FIGS. 5A-5D are flow diagrams illustrating a method for providing a playback queue and displaying a video feed with a video that is linked to an audio item in the playback queue, in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
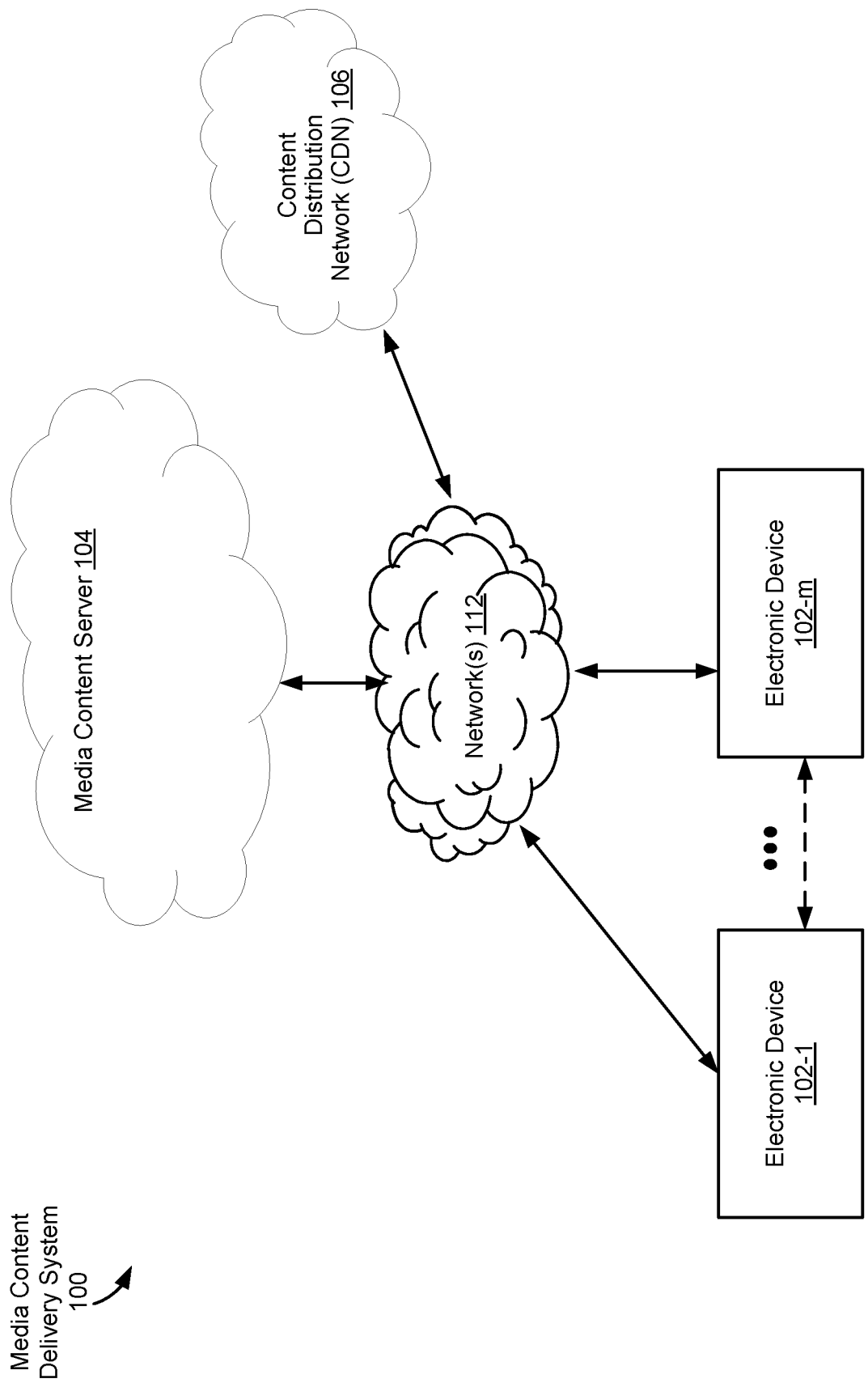
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device 102-m, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, an infotainment system, digital media player, a speaker, television (TV), and/or any other electronic device capable of presenting media content (e.g., controlling playback of media items, such as music tracks, podcasts, videos, etc.). Electronic devices 102 may connect to each other wirelessly and/or through a wired connection (e.g., directly through an interface, such as an HDMI interface). In some embodiments, electronic devices 102-1 and 102-m are the same type of device (e.g., electronic device 102-1 and electronic device 102-m are both speakers). Alternatively, electronic device 102-1 and electronic device 102-m include two or more different types of devices.

In some embodiments, electronic devices 102-1 and 102-m send and receive media-control information through network(s) 112. For example, electronic devices 102-1 and 102-m send media control requests (e.g., requests to play music, podcasts, movies, videos, or other media items, or playlists thereof) to media content server 104 through network(s) 112. Additionally, electronic devices 102-1 and **102-*m*, in some embodiments, also send indications of media content items to media content server 104 through network(s) 112. In some embodiments, the media content items are uploaded to electronic devices 102-1 and 102-*m* before the electronic devices forward the media content items to media content server 104**.

In some embodiments, electronic device 102-1 communicates directly with electronic device **102-*m* (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-*m*. In some embodiments, electronic device 102-1 communicates with electronic device 102-*m* through network(s) 112. In some embodiments, electronic device 102-1 uses the direct connection with electronic device 102-*m* to stream content (e.g., data for media items) for playback on the electronic device 102-*m***.

In some embodiments, electronic device 102-1 and/or electronic device **102-*m* include a media application 222 (FIG. 2) that allows a respective user of the respective electronic device to upload (e.g., to media content server 104), browse, request (e.g., for playback at the electronic device 102), and/or present media content (e.g., control playback of music tracks, playlists, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102**.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, audiobooks, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 includes a voice API, a connect API, and/or key service. In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
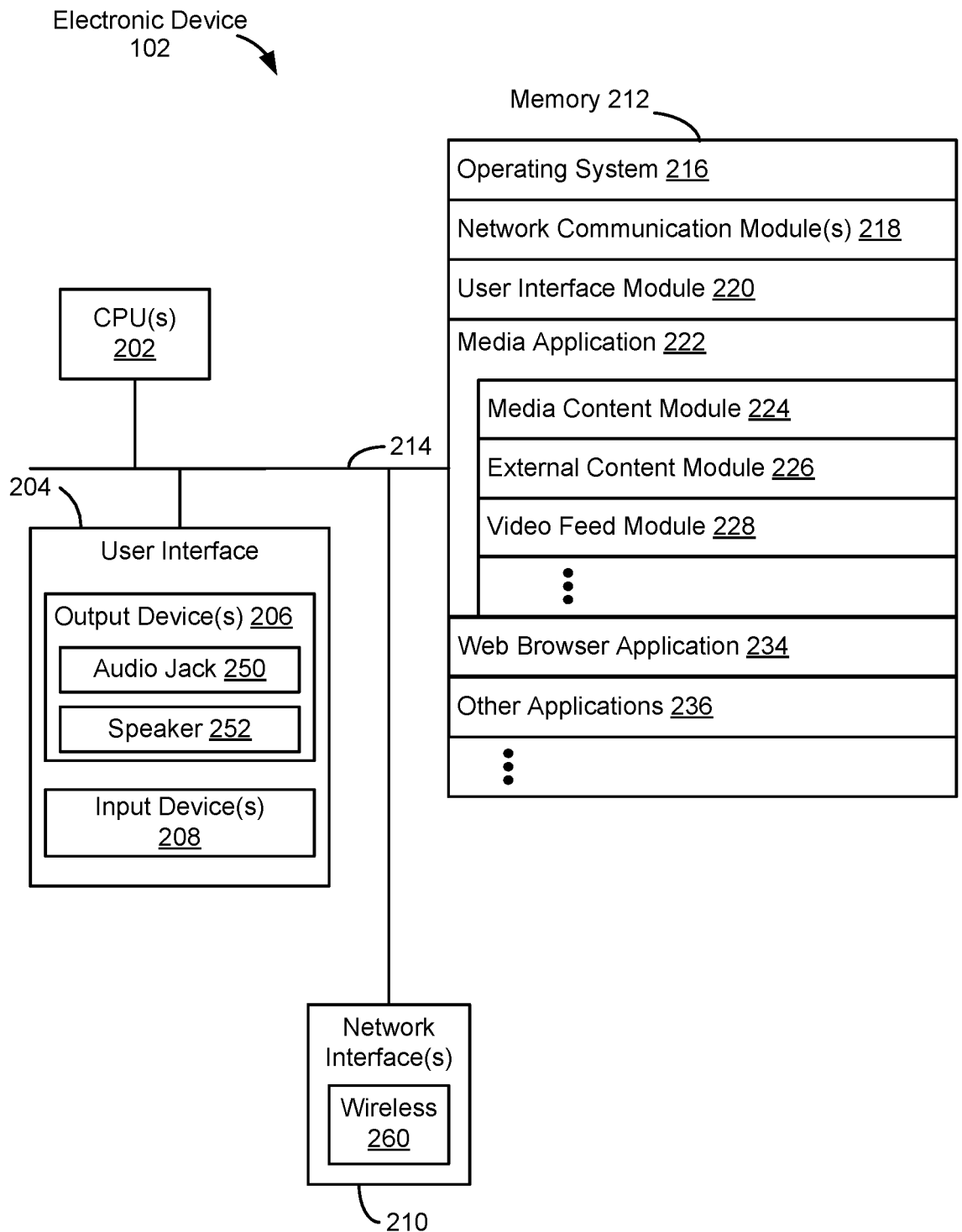
FIG. 2 is a block diagram illustrating an electronic device, in accordance with some embodiments.

FIG. 2 is a block diagram illustrating an electronic device 102 (e.g., electronic device 102-1 and/or electronic device **102-*m*, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214** optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems, and/or or other wireless (e.g., Bluetooth-compatible) devices (e.g., for streaming audio data to the media presentations system of an automobile). Furthermore, in some embodiments, the wireless interface 260 (or a different communications interface of the one or more network interfaces 210) enables data communications with other WLAN-compatible devices (e.g., a media presentations system) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the electronic device 102 (e.g., a client device) to other computing devices (e.g., media presentation system(s), media content server 104, and/or other client devices) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:
  - a media content module 224 for storing sets of media items for playback in a predefined order, the media items selected by the user (e.g., for a user-curated playlist) and/or the media items curated without user input (e.g., by the media content provider). In some embodiments, media content module 224 stores relationships between media content (e.g., audio tracks) and external content (e.g., artist videos), as indicated by the uploader of the external content;
  - an uploaded content module 226 for recording, uploading and/or saving content, such as videos, uploaded by a user including saving associations between the uploaded content and media content in the media content module, as indicated by the uploading user; and
  - a video feed module 228 for selecting (e.g., including selecting an order for display) and/or displaying video content items (e.g., uploaded video content items) in a video feed, and displaying representations of related content (e.g., artists, albums, tracks, and/or other videos) that is associated with the video content items;
- a web browser application 234 for accessing, viewing, and interacting with web sites; and
- other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
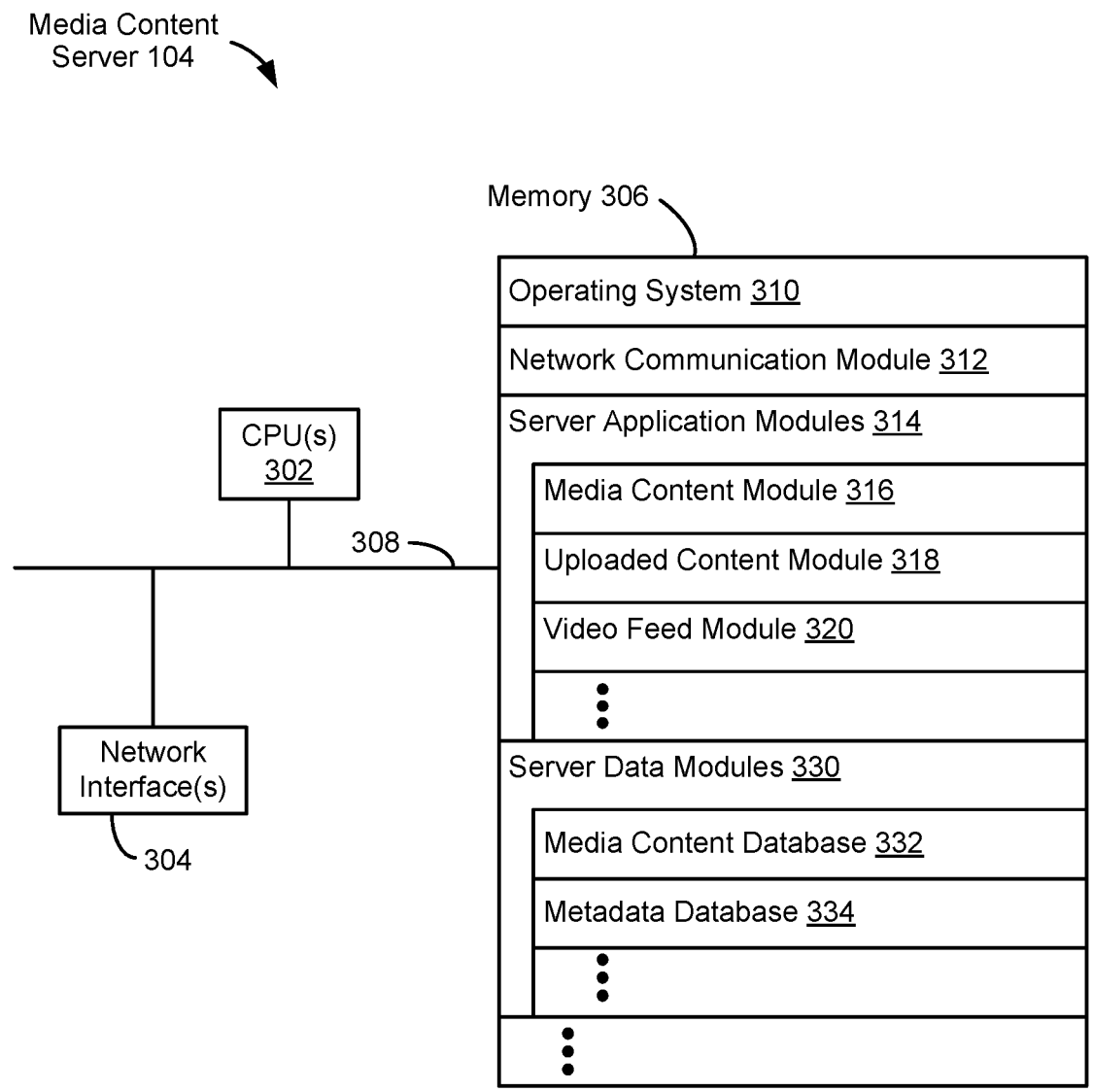
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

- an operating system 310 that includes procedures for handling various basic system services and for performing hardware-dependent tasks;
- a network communication module 312 that is used for connecting the media content server 104 to other computing devices via one or more network interfaces 304 (wired or wireless) connected to one or more networks 112;
- one or more server application modules 314 for performing various functions with respect to providing and managing a content service, the server application modules 314 including, but not limited to, one or more of:
  - a media content module 316 for storing, and providing (e.g., streaming) to electronic device 102, sets of media items for playback in a predefined order, the media items selected by the user (e.g., for a user-curated playlist) and/or the media items curated without user input (e.g., by the media content provider). In some embodiments, media content module 316 stores relationships between media content (e.g., audio tracks) and external content (e.g., artist videos), as indicated by the uploader of the external content;

an uploaded content module 318 for storing uploaded content (e.g., uploaded by electronic device 102 or another client device (e.g., an artist's client device)), such as videos, including storing (e.g., in a table or other database) associations between the uploaded content and media content in the media content module, as indicated by the uploading user; and a video feed module 320 for selecting (e.g., including selecting an order for display) and/or providing (e.g., to electronic device 102), for display, video content items (e.g., uploaded video content items) in a video feed, and providing, for display, representations of related content (e.g., artists, albums, tracks, and/or other videos) that is associated with the video content items;

one or more server data module(s) 330 for handling the storage of and/or access to media items and/or metadata relating to the media items; in some embodiments, the one or more server data module(s) 330 include:

a media content database 332 for storing media items; and a metadata database 334 for storing metadata relating to the media items, including a genre associated with the respective media items.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous Javascript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

FIG. 4A illustrates an example graphical user interface displayed at electronic device 102-1. In some embodiments, the graphical user interface is provided by a media application 222 that is executing on electronic device 102-1. In some embodiments, media application 222 is associated with a user profile (e.g., of a user of electronic device 102-1), including preferences of the user profile (e.g., to generate recommendations for the user of electronic device 102-1). In some embodiments, a server system (e.g., media content server 104) that is associated with the media application 222 provides instructions for displaying the graphical user interface (e.g., selects recommendations to be displayed at electronic device 102-1 and/or provides (e.g., streams) media content (e.g., tracks and/or video) that is not locally stored at electronic device 102-1).

In some embodiments, the graphical user interface illustrated in FIG. 4A is a Now Playing user interface that includes a status of a currently playing media item of a current listening session, such as a track (e.g., an audio item such as a song, a podcast, and/or a video item). For example, Song A is currently playing at electronic device 102-1 (e.g., or at another presentation device, such as an external speaker that is distinct from electronic device 102-1, for example, electronic device 102-$m$). In some embodiments, a representation 403 of Song A is displayed in the user interface. In some embodiments, representation 403 is an image (e.g., an album cover, cover art, or other image associated with Song A) and/or a video (e.g., a video clip associated with Song A).

In some embodiments, the Now Playing user interface includes one or more controls 404 for controlling playback of Song A, for example a heart to add Song A to a favorites list of the user, a skip back (e.g., to a previous track), a pause/play control, a skip forward control, and/or a shuffle control. In some embodiments, the Now Playing user interface further includes share control 405.

In some embodiments, Song A is a track that is played from a playback queue (e.g., corresponding to a current listening session). For example, the playback queue includes one or more media items (e.g., tracks or other audio items) in a playback order (e.g., which can be altered by selecting the shuffle control or by the user reordering the media items in the playback queue), such that a next media item is automatically played at the end of a currently playing media item in the playback queue. Further, the user is enabled to skip forward and/or backward in the playback queue to change a currently playing media item (e.g., Song A). In some embodiments, the user of electronic device 102-1 is enabled to modify the playback queue to add, remove, or reorder the one or more media items that are in the playback queue. In some embodiments, the playback queue corresponds to a playlist (e.g., curated by the user of electronic device 102-1, curated by the media provider associated with media application 222 and/or curated by another user of the media application). In some embodiments, the playback queue is stored, in memory of (e.g., locally at) electronic device 102-1.

In some embodiments, Song A is performed by (e.g., or otherwise associated with) Artist 1. In some embodiments, Artist 1 (or a producer or label associated with Artist 1) has uploaded (e.g., to the media application) one or more videos (e.g., Video 1 and Video 2), for example, to an Artist Page that provides information about the Artist and media items associated with the Artist. For example, an artist is enabled to record and/or upload a video of the artist addressing their fans and/or providing insights on the media items of the artist. In some embodiments, the selectable representation(s) of the videos uploaded by the artist are displayed in the Now Playing user interface (e.g., button 401 "Video 1 from Artist 1" and button 402 "Video 2 from Artist 1"). It will be understood that one of ordinary skill in the art having the benefit of this disclosure will understand that a user (e.g., artist) can upload video content for a variety of purposes, including but not limited to general storytelling, intros/previews to tracks, albums, or other music entities linked to the video (e.g., an artist providing a preview or sharing a story of a track) and/or announcing an upcoming or new album release, etc. In some embodiments, button 401 and/or button 402 are other selectable representations, such as hyperlinks, thumbnails (e.g., video thumbnails) illustrating a preview of the respective video, or other selectable content.

In some embodiments, the uploader of the video is enabled to (e.g., during the upload process) indicate one or more media items to be associated with the respective video. For example, the uploader is a user account that has permission to link the video with media items associated with Artist 1. In some embodiments, the uploader is the artist themselves, a manager, a producer, or another user that has permission to associate Artist 1 (e.g., and media items of Artist 1) with uploaded video content. For example, during the upload process of Video 1 and Video 2, Artist 1 indicates that Video 1 and Video 2 are to be associated with Song A. In some embodiments, the associations between video uploaded by an artist and/or user and media content items are stored (e.g., at media content server 104) such that the associations are provided to other users of the media application 222. For example, as described below, videos that are associated with media items are provided in a user interface such that users of media application 222 are enabled to discover the videos while playing back the media item(s) associated with the videos.

In some embodiments, video 1 and/or video 2 from Artist 1 includes audio that is distinct from the audio in Song A. For example, video 1 and/or video 2 are not necessarily music videos in which the Artist performs Song A. Instead, video 1 and/or video 2 are videos created by the Artist that enables the artist to connect with fans (e.g., by explaining background of the song, performing an interview, or other content that is distinct from performing Song A).

In some embodiments, in response to a user input 406 selecting button 401 for "Video 1 from Artist 1," the Now Playing user interface is replaced with display of a video feed, as illustrated in FIG. 4B. In some embodiments, playback of Song A (e.g., and the playback queue that includes Song A) is paused in response to the user navigating to the video feed illustrated in FIG. 4B. For example, audio from the videos in the video feed is played back while a respective video is playing (e.g., instead of Song A).

In some embodiments, playback of Song A continues after receiving the user input 406. For example, in some embodiments, the videos in the video feed are displayed (FIG. 4B) without the audio from the videos (e.g., the videos presented in the video feed are muted). In some embodiments, the videos in the video feed are displayed with a transcription (e.g., closed captions). In some embodiments, the videos in the video feed are muted as the user scrolls through the video feed and explores other content, until a user input for (i) unmuting a respective video is detected or (ii) playing back another content item (e.g., that is discovered using the video feed or is otherwise selected). As such, the playback queue that includes Song A is not interrupted as the user navigates between the video feed and other user interfaces to explore additional content. In some embodiments, in response to a user input to unmute a respective video in the video feed, the playback queue (e.g., Song A or another song played back from the playback queue) is interrupted (e.g., paused or otherwise ceased), and the audio from the respective video is played back.

Although the example described above illustrates a user input 406 is received in a Now Playing user interface for the currently playing song (e.g., Song A), it will be understood that in some embodiments, another user interface with a representation of Song A is displayed while a distinct media content item (e.g., not Song A) is currently played back at device 102. For example, the user is enabled to listen to a playback queue, for example, Song B from the playback queue, and while Song B is playing back, the user is enabled to browse other content items by navigating to other user interfaces distinct from the Now Playing user interface, such as other playlist pages, artist pages, album pages, etc. For example, the user navigates to an album page that includes Song A (e.g., which is not necessarily playing back at electronic device 102), and within the album page of Song A, representations of video 1 and/or video 2 from Artist 1 are displayed, such that the user is enabled to select (e.g., via user input 406) a respective representation of a respective video that is linked to Song A to navigate to the video feed from the album page that includes Song A (e.g., or other user interface that is currently displayed, such as an Artist page or a playlist user interface), as described in more detail below. As such, additional user interfaces provide selectable representations for linked video(s) associated with media content items, and the displayed user interfaces need not correspond to a currently playing back media item (e.g., the user is enabled to listen to track and continue navigating to other user interfaces outside of the Now Playing user interface).

In some embodiments, the video feed user interface illustrated in FIG. 4B includes a plurality of videos (e.g., video 408 and video 414). In some embodiments, the videos are displayed for the user in an order that is determined based on user preferences (e.g., indicated in the user's profile based on a playback history of the user). For example, the respective videos are associated with a plurality of respective artists and/or users (e.g., other than Artist 1) that the media providing service has determined may be of interest to the user of electronic device 102-1.

In some embodiments, the video feed user interface includes a video thumbnail (e.g., video preview or the video item) of Video 1 from Artist 1 that was selected by the user input 406. In some embodiments, the video thumbnail further includes a selectable representation of one or more tracks (e.g., or other media items, such as an album, playlist, or Artist) that are associated with Video 1. For example, button 410 with a representation of Song A is displayed with Video 1. It will be understood that although button 410 is displayed as overlaying video 1, alternative arrangements of the representation of Song A are enabled, such as below, above, or to the side of the video thumbnail of Video 1.

Figure 4D:
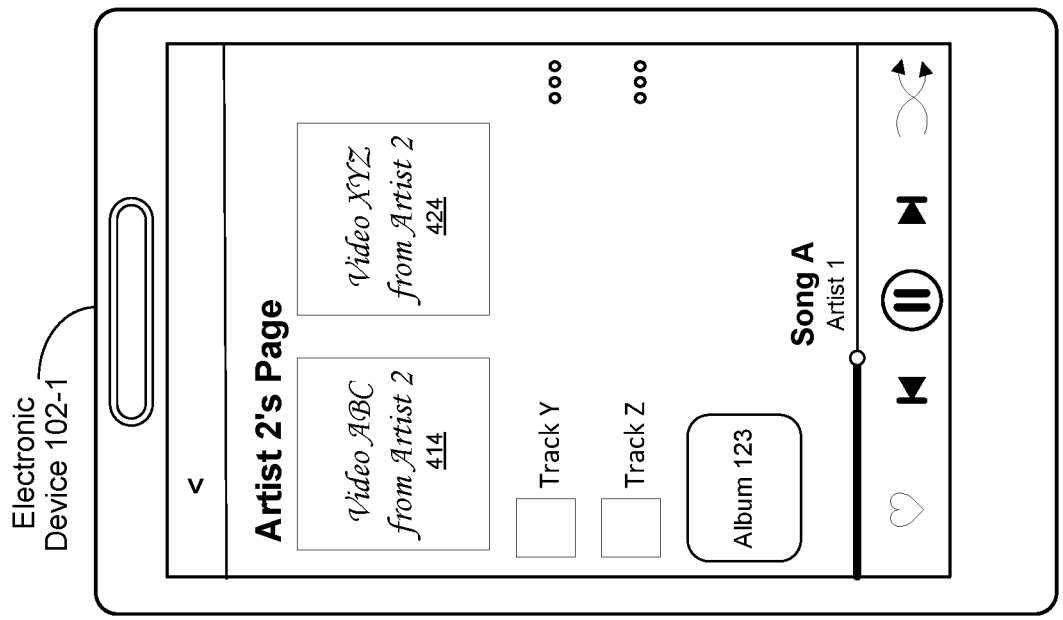
Figure 4C:
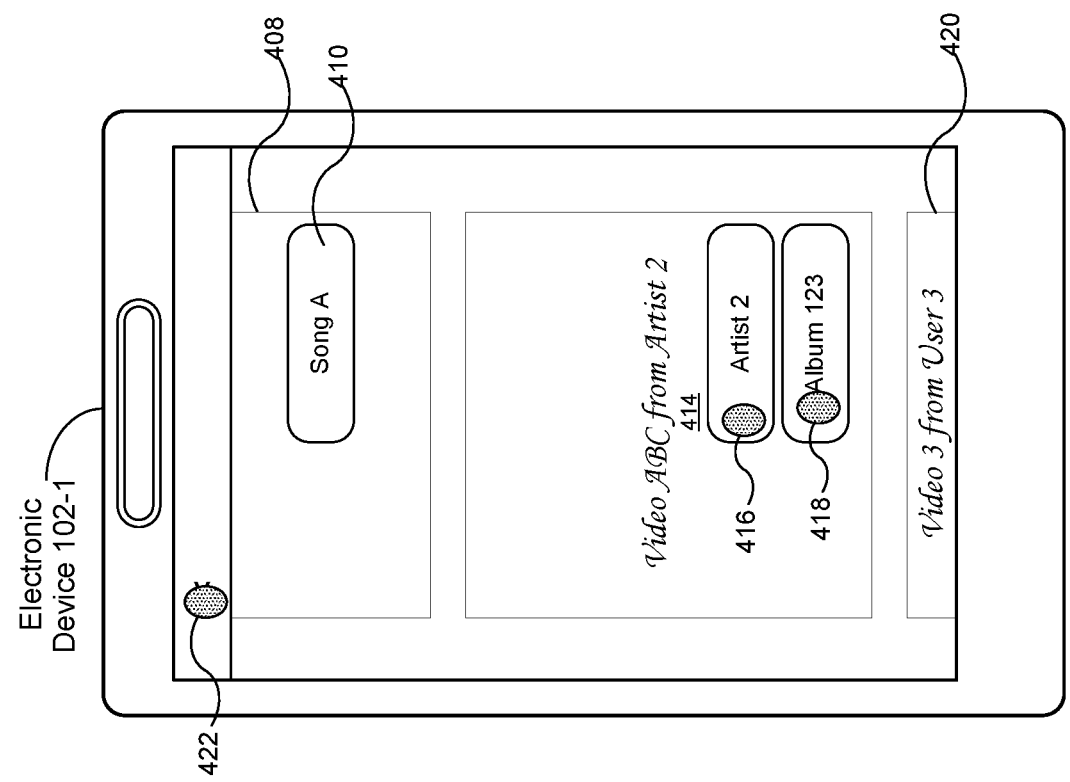

In some embodiments, the video feed user interface is a scrollable feed in which users are enabled to scroll (e.g., or otherwise navigate) to additional videos from other artists and/or users. For example, in response to a user input 412 to scroll down in the user interface, the video feed scrolls to display a video thumbnail of Video ABC, as illustrated in FIG. 4C. In some embodiments, the video thumbnail of Video 1 ceases to be displayed (or otherwise appears to scroll out of the display area of the electronic device 102-1). In some embodiments, in response to the user scrolling in the video feed, the video 414 corresponding to Video ABC automatically begins to playback (e.g., the video plays without additional user input). In some embodiments, the video 414 corresponding to Video ABC includes selectable representations of media items that are associated with Video ABC (e.g., based on a lookup of the stored associations indicated by video-uploading users). For example, in FIG. 4C, Video ABC is associated with Artist 2 and Album 123.

FIG. 4C further illustrates that the video feed is further scrollable to view additional video thumbnails (e.g., the video 420 corresponding to video 3 from user 3). In some embodiments, the videos represented in the video feed are associated with a variety of artists and/or users. In some embodiments, as described above, the videos represented in the video feed are presented in a particular order to the user based on the user's preferences or a user profile (e.g., to help the user discover new artists or to present the user with content from artists that the user already consumes).

In some embodiments, the user is enabled to select one or more of the representations of media items that are displayed in association with a respective video in the video feed. For example, a user input 416 selects the button for "Artist 2," and in response to the user input, the user interface is updated to display an artist page for Artist 2, as illustrated in FIG. 4D. In some embodiments, the artist page for Artist 2 includes one or more videos (e.g., or video previews, thumbnails, or other indications of videos) associated with Artist 2, including video 414 and/or video 424.

In some embodiments, the user interface corresponding to the video feed includes a back button that enables the user to navigate back to the Now Playing user interface illustrated in FIG. 4A. For example, user input 422 in FIG. 4C selects the back button and, in response to the user input 422, the Now Playing user interface is redisplayed, and playback of Song A continues (e.g., resume) from the position at which it was paused.

In some embodiments, in response to user input 416, the video feed user interface ceases to be displayed, and the listening session is resumed (e.g., Song A resumes playback). For example, playback of Song A is paused while displaying the video feed (e.g., the video feed including videos that have audio content distinct from Song A), so that the audio content of videos in the video feed are optionally played back instead of Song A, and after the user navigates away from the video feed, playback of Song A is resumed (e.g., automatically without additional user input). As such, while the user is viewing Artist 2's page, Song A is optionally playing back.

Figure 4F:
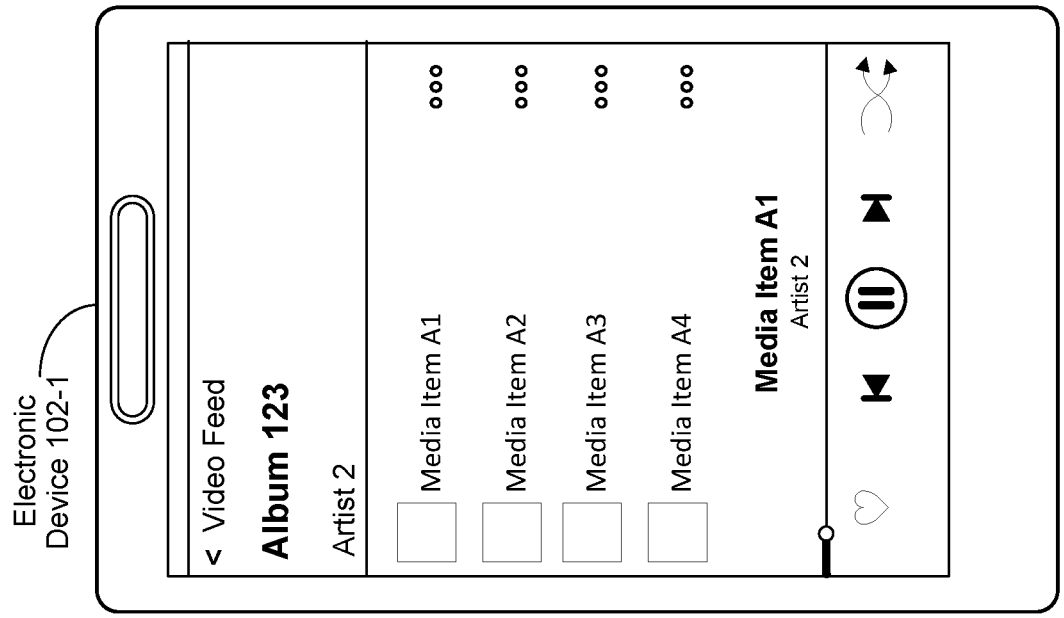
Figure 4E:
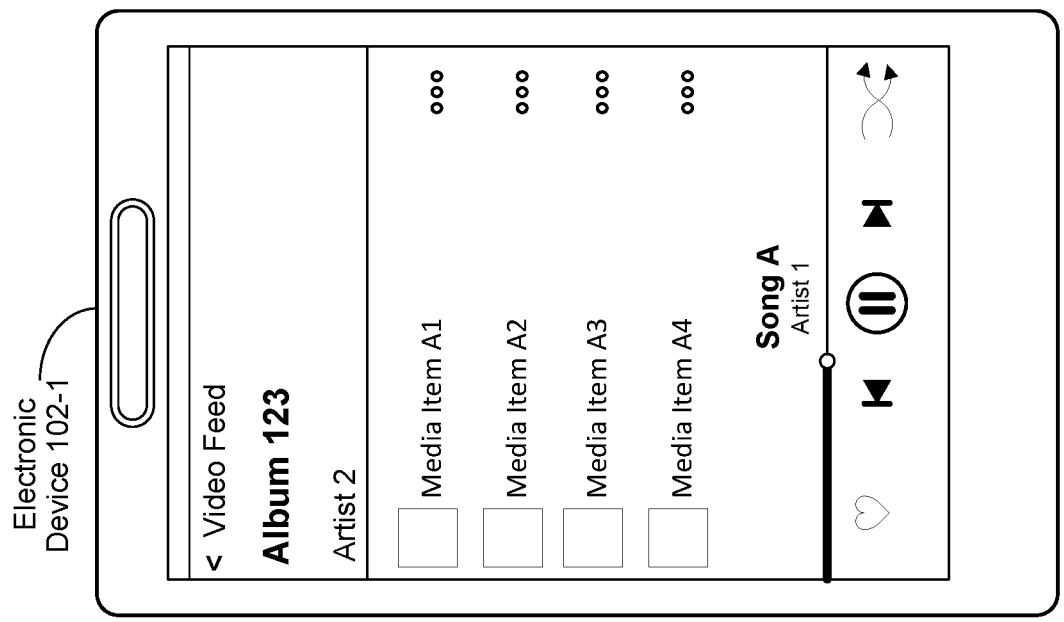

In some embodiments, in response to the user selecting, via user input 418, the representation of Album 123 (e.g., which is also associated with Video ABC) in FIG. 4C, the user interface is updated to display an album page for Album 123, as illustrated in FIGS. 4E and 4F.

In some embodiments, in response to the user input 418, the electronic device 102-1 automatically (e.g., without additional user input) resumes playback of Song A (e.g., which was paused in response to the user navigating to the video feed in FIG. 4B), as illustrated in FIG. 4E. For example, the playback queue from which the user was playing back audio (e.g., Song A) begins to playback, thereby continuing a listening session of the user as the user views the album page illustrated in FIG. 4E. The user is then enabled to select a media item for playback from the currently displayed album page to cease the listening session for Song A (e.g., and to begin a new listening session or otherwise modify the playback queue to include a media item from Album 123). As such, the playback queue described with reference to FIG. 4A is maintained while the user views the video feed, artist pages and/or album pages.

In some embodiments, as illustrated in FIG. 4F (e.g., as an alternative to FIG. 4E), in response to the user input 418, the electronic device 102-1 automatically (e.g., without additional user input) plays back a media item from the selected album page (e.g., Media Item A1 from Album 123), thereby modifying and/or ending the playback queue that was presenting Song A in FIG. 4A.

FIGS. 5A-5D are flow diagrams illustrating a method 500 for providing a playback queue and displaying a video feed with a video that is linked to an audio item in the playback queue, in accordance with some embodiments. Method 500 may be performed at a computer system (e.g., media content server 104 and/or electronic device(s) 102) having one or more processors and memory storing instructions for execution by the one or more processors. In some embodiments, the method 500 is performed by executing instructions stored in the memory (e.g., memory 212, FIG. 2, memory 306, FIG. 3) of the computer system. In some embodiments, the method 500 is performed by a combination of the server system (e.g., including media content server 104 and CDN 106) and a client device.

Referring now to FIG. 5A, in performing the method 500, the computer system provides (502), from a playback queue of a plurality of audio items, a played audio item of the plurality of audio items for playback (e.g., to a consumer of a music streaming service). For example, as described with reference to FIG. 4A, "Song A" (e.g., the played audio item) is played back at electronic device 102-1 (e.g., server 104 provides an instruction to electronic device 102-1 to playback Song A) from a playback queue (e.g., a playlist ("Today's Top Hits"), album, or other queue that is modified and/or controlled by the user of electronic device 102-1).

In some embodiments, the playback queue is (504) a curated list of audio items (e.g., curated by the media content provider), for example a playlist of audio items, such as "Today's Top Hits" illustrated in FIG. 4A.

In some embodiments, the playback queue is (506) an ordered list of audio items that is stored. For example, the playback queue is accessible to the user of electronic device 102-1 to view upcoming and/or previously played audio items in the playback queue.

While providing the played audio item for playback, the computer system displays (508) a representation of a video content item (e.g., video thumbnail) associated with (e.g., linked to) a first audio item (e.g., a video content item linked to the first audio item by the artist, the first audio item being the played audio item or a different audio item from a catalog), wherein the video content item includes audio content that is distinct from audio content from the first audio item. For example, in FIG. 4A, "Video 1 from Artist 1" is displayed as a selectable button 401 (e.g., or as a thumbnail of Video 1) and "Video 2 from Artist 1" is displayed as selectable button 402 (e.g., or as a thumbnail of Video 2) are displayed concurrently in the now playing user interface of Song A. In some embodiments, the played audio item corresponds to Song B (e.g., not Song A), and the computer system displays a user interface other than the Now Playing user interface (e.g., an album page) that includes a representation of Song A and selectable representations of videos associated with song A.

The computer system receives (510) a first user input selecting the representation of the video content item (e.g., thumbnail). For example, user input 406 in FIG. 4A is an input selecting Video 1 from Artist 1.

In response to the first user input (512), the computer system provides (e.g., displays) a user interface for browsing a plurality of video content items, including (i) the video content item associated with the first audio item and (ii) one or more other video content items respectively associated with one or more other audio items distinct from the first audio item. For example, displaying the user interface for browsing a plurality of video content items includes launching a video feed that shows/plays the video content item linked to the first audio item, the video feed being browsable/scrollable by the user/consumer to the other video content items that are respectively linked to the other audio items (e.g., by the same and/or other artists), including albums and/or tracks.

In some embodiments, in response to the first user input, the computer system ceases (511) playback of the played audio item and provides (e.g. displays) the user interface for browsing the plurality of video content items, including providing an unmuted version of audio content of the plurality of video content items. For example, in response to user input 406, playback of Song A is paused (e.g., stopped or otherwise ceased) and the video feed illustrated in FIG. 4B is displayed.

In some embodiments, in response to the first user input, the computer system (513) (i) continues playback of the played audio item and (ii) provides the user interface for browsing the plurality of video content items, including providing a muted version of audio content of the plurality of video content items. For example, in response to the first user input the video content items displayed in the video feed are muted and optionally displayed with a transcription of audio (e.g., closed captions) while playback of Song A continues. As such, the listening session continues (e.g., is not paused or ceased) as the user browses the video feed.

In some embodiments, while providing (e.g., displaying) the user interface for browsing the plurality of video content items, the computer system receives a user input corresponding to a request to unmute a respective video content item of the plurality of video content items (e.g., while the video feed was initially displayed with video content items muted), and in response to the user input, the computer system ceases playback of the played audio item of the plurality of audio items in the playback queue and playing audio of the respective video content item of the plurality of video content items. For example, in response to the user input requesting to unmute a video content item in the video feed, the listening session (e.g., Song A) is paused and/or ceases to be presented, and the audio for the video content item is played back.

In some embodiments, after receiving the user input requesting to unmute a video content item, while the audio for a video content item (e.g., the same or a different video content item as the one displayed that is unmuted) that is displayed in the video feed is playing back (e.g., concurrently with the video content item that is displayed in the video feed), the computer system detects a user input to mute the video content item that is currently playing back. In some embodiments, in response to the user input to mute the video content item, the playback queue is resumed from a position at which it was paused (e.g., in response to the user input requesting to unmute the video content item). For example, while providing the user interface for browsing the plurality of video content items, receiving a third user input corresponding to a request to unmute a respective video content item of the plurality of video content items; and in response to the third user input, (i) ceasing playback of the played audio item and (ii) providing audio of the respective video content item of the plurality of video content items.

In some embodiments, the computer system detects (514) (e.g., after the user scrolls to a second video content item and while the second video content item is being played back in the user interface/video feed) a second user input selecting a representation of a second audio item that is associated with a second video content item of the one or more other video content items displayed in the user interface (e.g., selecting an icon representing a track or album that has been linked to the second video content item, the icon being displayed in the video feed during playback of the second video content item). For example, FIG. 4B illustrates a scroll user input for scrolling to view Video ABC from Artist 2 (414) in FIG. 4C. In some embodiments, the second user input corresponds to user input 416 and/or user input 418 directed to respective representations of linked media items (e.g., artist pages and/or audio items such as tracks or albums), as described above with reference to FIG. 4C.

In response to the second user input selecting the second audio item, the computer system provides (e.g., displays) (516), a user interface for the second audio item (e.g., an album page that includes the second audio item) and ceases display of the second video content item (and/or the user interface/video feed for browsing a plurality of video content items). For example, as described with reference to FIGS. 4C-4D, in response to user input 416, the video feed is no longer displayed and a user interface for Artist 2's artist page is displayed. In some embodiments, as described with reference to FIGS. 4C and 4E, in response to user input 418 selecting the audio item "Album 123," a user interface for Album 123 is displayed.

In some embodiments, the computer system, while displaying the user interface for the second audio item, reinitiates (518) playback of the played audio item in the playback queue (e.g., at a position that playback was ceased in response to the first user input). For example, in FIG. 4E, Song A is automatically, without additional user input (e.g., without additional input received after user input 418 selecting Album 123), played back (e.g., from a position at which it was paused in response to user input 406). In some embodiments, as described with reference to FIG. 4F, Song A is not automatically reinitiated (e.g., the playback queue does not continue to be presented automatically after the user navigates away from the video feed user interface).

In some embodiments, each respective video content item of the one or more other video content items in the user interface for browsing the plurality of video content items is displayed (520) with a representation of the respective audio item that is associated with the respective video content item (the audio item is a track or an album). For example, as described with reference to FIGS. 4B-4C, in the video feed user interface, the representation (e.g., thumbnail) of each video content item is displayed with a button, hyperlink, or other user-selectable user interface object for a linked media item (e.g., audio item) that is associated with the respective video content item. For example, button 410 for Song A is displayed in FIG. 4B as the audio item that is linked to Video 1 from Artist 1.

In some embodiments, the computer system, while displaying the user interface for browsing the plurality of video content items, automatically initiates (522) playback of a video content item of the plurality of video content items in the displayed user interface, wherein the video content item is associated with the first audio item. For example, in FIGS. 4B and 4C, the video content item that is in the center-most portion of the video feed user interface is automatically (e.g., without user input) played back within its representation (e.g., video 408 or video 414).

In some embodiments, the computer system, while displaying the user interface for browsing the plurality of video content items, receives (524) a user input to navigate back to the playback queue. For example, in FIG. 4C, a user input 422 is detected on the back button to return to the playback queue (e.g., the Now Playing user interface illustrated in FIG. 4A).

In some embodiments, the one or more other video content items displayed in the user interface include (526) respective video content items are uploaded by different respective users (e.g., artist/owner accounts, or other users that have permission to control the artist account, such as user accounts of managers, publishers and/or companies associated with the artist that have permission to link content related to the artist to audio items of the artist). For example, Video 1 from Artist 1 in FIG. 4B is uploaded by (e.g., and linked to Song A by) Artist 1 (e.g., or by another user account, such as a manager, publisher, or company account, with permission to link songs by Artist 1 to video content), and Video ABC from Artist 2 is uploaded by (e.g., and linked to Artist 2 and/or Album 123 by) Artist 2 (e.g., or by another user account, such as a manager, publisher, or company account, with permission to link musical entities for Artist 2 to video content).

In some embodiments, the computer system, in response to the second user input selecting the second audio item, provides (528), for playback, the second audio item (e.g., as a new session corresponding to a distinct playback queue). For example, as described with reference to FIG. 4F, in some embodiments, the audio item that is selected by user input 418 (e.g., Albums 123) is automatically played back. It will be understood that although the example in FIGS. 4C and 4F illustrated an album being selected and automatically played back in response to the user input, if the linked audio item is a track (e.g., or podcast episode or other individual media item, as opposed to a list of media items (e.g., a playlist or an album)), the track is then provided for playback.

In some embodiments, the video content item that is associated with the first audio item is (530) associated with a first user; and the one or more other video content items respectively associated with one or more other audio items distinct from the first audio item displayed in the user interface are respectively associated with a plurality of distinct users other than the first user (e.g., the video content items are associated with a plurality of different artists). For example, in FIGS. 4B-4C, the video feed displays (e.g., as the user scrolls through different videos in the video feed), Video 1 from Artist 1 408, Video ABC from Artist 2, and Video 3 from User 3 (e.g., a user having permission to upload video 3 and link video 3 to media content items). Thus, each video in the video feed is associated with a different artist and/or user. It will be understood that a plurality of videos in the video feed may associated with a same artist and/or user, however, the video feed also displays additional video for other artists and/or users to enable the user to discover other content (e.g., from other artists and/or users) via the video feed.

In some embodiments, the one or more other video content items displayed in the user interface for browsing a plurality of video content items are selected (532) (e.g., and/or ordered) using a recommender engine. In some embodiments, the recommender engine determines the affinity scores for the respective video content items. In some embodiments, the computer system, in response to detecting the second user input selecting the representation of the second audio item that is associated with the second video content item of the one or more other video content items displayed in the user interface, updates the recommender engine based on the second user input (e.g., the recommender engine is updated based on user interaction/consumption of discovered content displayed in the discovery feed (e.g., the user interface for browsing a plurality of video content items)). For example, the order of the videos in the video feed illustrated in FIGS. 4B-4C is based on an affinity score of the user of electronic device 102-1 (e.g., the first video in the video feed, Video 1, has a higher affinity score than the affinity score of Video ABC, and Video ABC has a higher affinity score than the affinity score of Video 3). The recommender engine that calculates the respective affinity scores determines the order of display of the video items in the video feed. In some embodiments, as the user of electronic device 102-1 discovers (e.g., selects) content from the video feed, the affinity scores of the user are updated based on the user's selections. For example, additional content related to content the user has selected will be provided.

In some embodiments, the computer system, while displaying the user interface for browsing a plurality of video content items, detects (534) a user input to scroll the user interface; and displays a representation of the second video content item and the representation of the second audio item that is associated with the second video content item in the user interface. In some embodiments, the second video content item is displayed in response to a user input to browse/scroll to the second video content item in the discovery feed. For example, in response to user input 412 (FIG. 4B), the video feed is scrolled to display another video (e.g., Video ABC).

In some embodiments, the computer system, after (e.g., in response to) detecting the user input to scroll the user interface, automatically (e.g., without additional user input) plays back (536) the second video content item. For example, in FIG. 4C, Video ABC automatically begins to play back without requiring user input after scrolling to display Video ABC in the center portion of the video feed.

In some embodiments, the computer system, in response to the user input to scroll the user interface, ceases display (538) of the video content item associated with the first audio item in the user interface (e.g., as the user browses to other video content items). For example, Video 1 is scrolled off the display in FIG. 4C (e.g., the electronic device 102-1 optionally displays a portion of Video 1 as it is scrolled off the display).

In some embodiments, the computer system receives (540) a fourth user input (e.g., prior to receiving the first user input) corresponding to a request to associate the first audio item with the video content item; and in response to receiving the fourth user input, associates the first audio item with the video content item. For example, the fourth user input links the first audio item with the video content item (e.g., to be stored in a database or other table of the media providing service). In some embodiments, the fourth user input is received while the user with permission to upload the video content item (e.g., the artist, producer or other user account with permission), such that the user links the uploaded video content item to the first audio item (e.g., and optionally other audio items in the library of the media content provider (e.g., that are associated with the artist, producer or user account)). For example, as described with reference to FIG. 4A, in some embodiments, during upload of Video 1 and/or Video 2, Artist 1 (e.g., or another user with permission to link content associated with Artist 1), links the uploaded video to Song A by Artist 1.

In some embodiments, the first user input selecting the representation of the video content item is received (542) from a first user (e.g., a consumer using the application), and the fourth user input is received from a second user, distinct from the first user. For example, the user of electronic device 102-1 is the first user that performs user input 406 selecting Video 1, and is distinct from the second user (e.g., Artist 1 or another user with permission) that uploaded the Video 1. In some embodiments, the second user is an artist or other user account having permission to do so. In some embodiments, the first user (e.g., the account associated with the first user) does not have permission to link the video content item to the audio item. For example, only certain users (e.g., artists, publishers, or other user accounts with permission) are enabled to associate audio items with video content items (e.g., the audio items and/or video content items are related to the certain users that have permission to link said audio items and/or video content items with other audio/video items that are associated with those certain users).

In some embodiments, the computer system, for each respective video content item in the one or more video content items provided (e.g., displayed) in the user interface, determines (544) a respective score (e.g., the affinity score) based on stored data for the respective video content item, the stored data indicating an affinity (i) between the first user (e.g., fan) and the second user (e.g., artist) that uploaded the respective video content item and/or (ii) between the first user and a music entity (e.g., an audio item, such as an album) associated with (e.g., linked to) the respective video content item. In some embodiments, the affinity is based on one or more other factors, such as the user of electronic device 102-1's affinity to an album in which a track is found (e.g., if the track is the linked music entity) and/or affinity to similar artists and/or tracks (e.g., based on metadata for the artist and/or tracks, such as genre, danceability, popularity, etc.). For example, the affinity score is used to determine the order of display of the video content items in the video feed.

In some embodiments, the computer system determines (546) an order to display the one or more other video content items based on respective affinity scores for the respective video content items in the one or more other video content items (e.g., that are determined from the affinity analysis of the audio items directly or indirectly associated with the video content items). For example, the video content items are displayed in the video feed illustrated in FIGS. 4B-4C in order from a highest score to a lowest score (e.g., or vice-versa depending on the scoring mechanism).

Although FIGS. 5A-5D illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
providing, from a playback queue of a plurality of audio items, a played audio item of the plurality of audio items for playback, wherein the played audio item does not include video content;
while providing the played audio item for playback, displaying a first user interface for the played audio item that includes a representation of a video content item associated with a first audio item, wherein the video content item includes audio content that is distinct from audio content from the first audio item;
receiving a first user input selecting the representation of the video content item in the first user interface;
in response to the first user input:
providing a second user interface for browsing a plurality of video content items, including (i) the video content item associated with the first audio item and (ii) one or more other video content items respectively associated with one or more other audio items distinct from the first audio item;
while providing a second video content item of the one or more other video content items displayed in the second user interface, detecting a second user input selecting a representation of a second audio item that is associated with the second video content item of the one or more other video content items displayed in the second user interface, the second audio item including audio content that is distinct from audio content from the second video content item; and
in response to the second user input selecting the second audio item, providing, in the first user interface, the second audio item and ceasing to provide the second video content item in the second user interface for browsing a plurality of video content items.

2. The method of claim 1, including, in response to the first user input, (i) ceasing playback of the played audio item and (ii) providing the second user interface for browsing the plurality of video content items, including providing an unmuted version of audio content of the plurality of video content items.

3. The method of claim 1, including, in response to the first user input, (i) continuing playback of the played audio item and (ii) providing the second user interface for browsing the plurality of video content items, including providing a muted version of audio content of the plurality of video content items.

4. The method of claim 3, including:
while providing the second user interface for browsing the plurality of video content items, receiving a third user input corresponding to a request to unmute a respective video content item of the plurality of video content items; and
in response to the third user input, (i) ceasing playback of the played audio item and (ii) providing audio of the respective video content item of the plurality of video content items.

5. The method of claim 1, including, in response to the second user input selecting the second audio item, providing, for playback, the second audio item.

6. The method of claim 1, including:
receiving a fourth user input corresponding to a request to associate the first audio item with the video content item; and in response to receiving the fourth user input, associating the first audio item with the video content item.

7. The method of claim 6, wherein:
the first user input selecting the representation of the video content item is received from a first user; and
the fourth user input is received from a second user, distinct from the first user.

8. The method of claim 7, including, for each respective video content item in the one or more other video content items provided in the second user interface, determining a respective score based on stored data for the respective video content item, the stored data indicating an affinity (i) between the first user and the second user that uploaded the respective video content item and/or (ii) between the first user and a music entity associated with the respective video content item.

9. The method of claim 8, including determining an order to display the one or more other video content items based on respective affinity scores for the respective video content items in the one or more other video content items.

10. The method of claim 1, wherein each respective video content item of the one or more other video content items in the second user interface for browsing the plurality of video content items is displayed with a representation of the respective audio item that is associated with the respective video content item.

11. The method of claim 1, further comprising, while providing the second user interface for browsing the plurality of video content items, automatically initiating playback of a video content item of the plurality of video content items in the displayed second user interface, wherein the video content item is associated with the first audio item.

12. The method of claim 1, further comprising, while providing the second user interface for browsing the plurality of video content items, receiving a user input to navigate back to the playback queue.

13. The method of claim 1, wherein the playback queue is an ordered list of audio items that is stored.

14. The method of claim 1, wherein:
the video content item that is associated with the first audio item is associated with a first user; and
the one or more other video content items respectively associated with one or more other audio items distinct from the first audio item provided in the user interface are respectively associated with a plurality of distinct users other than the first user.

15. The method of claim 14, wherein:
the one or more other video content items displayed in the second user interface for browsing a plurality of video content items are selected using a recommender engine; and
the method further includes:
in response to detecting the second user input selecting the representation of the second audio item that is associated with the second video content item of the one or more other video content items provided in the user interface, updating the recommender engine based on the second user input.

16. The method of claim 1, further including:
while providing the second user interface for browsing a plurality of video content items, detecting a user input to scroll the second user interface; and
displaying a representation of the second video content item and the representation of the second audio item that is associated with the second video content item in the second user interface.

17. The method of claim 16, including, after detecting the user input to scroll the second user interface, automatically playing back the second video content item.

18. The method of claim 16, including, in response to the user input to scroll the second user interface, ceasing display of the video content item associated with the first audio item in the second user interface.

19. A computer system, comprising:
one or more processors; and
memory storing one or more programs, the one or more programs including instructions for:
providing, from a playback queue of a plurality of audio items, a played audio item of the plurality of audio items for playback, wherein the played audio item does not include video content;
while providing the played audio item for playback, displaying a first user interface for the played audio item that includes a representation of a video content item associated with a first audio item, wherein the video content item includes audio content that is distinct from audio content from the first audio item;
receiving a first user input selecting the representation of the video content item in the first user interface;
in response to the first user input:
providing a second user interface for browsing a plurality of video content items, including (i) the video content item associated with the first audio item and (ii) one or more other video content items respectively associated with one or more other audio items distinct from the first audio item;
while providing a second video content item of the one or more other video content items displayed in the second user interface, detecting a second user input selecting a representation of a second audio item that is associated with the second video content item of the one or more other video content items displayed in the second user interface, the second audio item including audio content that is distinct from audio content from the second video content item; and
in response to the second user input selecting the second audio item, providing, in the first user interface, the second audio item and ceasing to provide the second video content item in the second user interface for browsing a plurality of video content items.

20. A non-transitory computer-readable storage medium storing one or more programs for execution by an electronic device with one or more processors, the one or more programs comprising instructions for:
providing, from a playback queue of a plurality of audio items, a played audio item of the plurality of audio items for playback, wherein the played audio item does not include video content;
while providing the played audio item for playback, displaying a first user interface for the played audio item that includes a representation of a video content item associated with a first audio item, wherein the video content item includes audio content that is distinct from audio content from the first audio item;
receiving a first user input selecting the representation of the video content item in the first user interface;
in response to the first user input:
providing a second user interface for browsing a plurality of video content items, including (i) the video content item associated with the first audio item and (ii) one or more other video content items respectively associated with one or more other audio items distinct from the first audio item;

while providing a second video content item of the one or more other video content items displayed in the second user interface, detecting a second user input selecting a representation of a second audio item that is associated with the second video content item of the one or more other video content items displayed in the second user interface, the second audio item including audio content that is distinct from audio content from the second video content item; and in response to the second user input selecting the second audio item, providing, in the first user interface, the second audio item and ceasing to provide the second video content item in the second user interface for browsing a plurality of video content items.

* * * * *